United States Patent
Murdock, IV et al.

(10) Patent No.: US 11,880,661 B2
(45) Date of Patent: Jan. 23, 2024

(54) UNSUPERVISED DYNAMIC CONFIDENCE THRESHOLDING FOR ANSWERING QUESTIONS

(71) Applicant: INTERNATIONAL BUSINESS MACHINES CORPORATION, Armonk, NY (US)

(72) Inventors: James William Murdock, IV, Amawalk, NY (US); Anastas Stoyanovsky, Pittsburgh, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 393 days.

(21) Appl. No.: 17/213,676

(22) Filed: Mar. 26, 2021

(65) Prior Publication Data
US 2022/0309246 A1    Sep. 29, 2022

(51) Int. Cl.
*G06F 40/30* (2020.01)
*G06N 20/00* (2019.01)
*G06N 5/04* (2023.01)
*G06F 40/205* (2020.01)

(52) U.S. Cl.
CPC .............. *G06F 40/30* (2020.01); *G06N 5/04* (2013.01); *G06N 20/00* (2019.01); *G06F 40/205* (2020.01)

(58) Field of Classification Search
None
See application file for complete search history.

(56) References Cited

U.S. PATENT DOCUMENTS

| | | |
|---|---|---|
| 9,053,425 B2 | 6/2015 | Barborak et al. |
| 10,216,804 B2 | 2/2019 | Chu-Carroll et al. |
| 10,572,801 B2 | 2/2020 | Mars et al. |
| 10,585,991 B2 | 3/2020 | Miller et al. |
| 10,594,811 B2 | 3/2020 | Kozloski et al. |
| 10,614,725 B2 | 4/2020 | Boguraev et al. |

(Continued)

OTHER PUBLICATIONS

Hung et al., "Statistical Methods for Replicability Assessment", Feb. 2020, 29 pages.

(Continued)

*Primary Examiner* — Nafiz E Hoque
(74) *Attorney, Agent, or Firm* — Nicholas Welling; Andrew D. Wright; Calderon Safran & Cole P.C

(57) ABSTRACT

A method includes receiving, by a question answering system having a confidence threshold, plural questions from one or more user devices. The method includes processing each one of the questions by: generating an answer to the one of the questions; determining a confidence score of the answer; in response to determining the confidence score is greater than the confidence threshold, increasing the confidence threshold and returning the answer to the user device that generated the one of the questions; and in response to determining the confidence score is less than the confidence threshold, decreasing the confidence threshold and not returning the answer to the user device that generated the one of the questions. The increasing the confidence threshold and the decreasing the confidence threshold are performed such that the question answering system returns answers for the plural questions at a frequency that approximates a pre-defined target answering frequency.

20 Claims, 7 Drawing Sheets

(56) References Cited

U.S. PATENT DOCUMENTS

| | | |
|---|---|---|
| 10,742,676 B2 | 8/2020 | Mahaffey et al. |
| 2017/0140034 A1 | 5/2017 | Kalyanpur et al. |
| 2018/0090136 A1* | 3/2018 | Connell, II ............ G06F 40/20 |
| 2018/0266531 A1 | 9/2018 | Brown et al. |
| 2019/0188271 A1 | 6/2019 | Murdock et al. |
| 2020/0042643 A1* | 2/2020 | Carrier ..................... G06N 5/01 |
| 2020/0043485 A1* | 2/2020 | Tonetti .................... G10L 15/22 |

OTHER PUBLICATIONS

Disclosed Anonymously, "Quantum Affinity Assessment", ip.com, IPCOM000262775D, Jun. 29, 2020, 11 pages.

Disclosed Anonymously, "Method and System for Improving Fidelity of Dynamically Retrieved Answers via Conversational Unsupervised Learning", ip.com, IPCOM000256532D, Dec. 6, 2018, 4 pages.

Disclosed Anonymously, "Method for Generating Automated Essay Scoring Using a Factoid Question and Answer System", ip.com, IPCOM000255545D, Oct. 1, 2018, 2 pages.

Mell et al., "The NIST Definition of Cloud Computing", NIST, Special Publication 800-145, Sep. 2011, 7 pages.

Lau, "Learning Rate Schedules and Adaptive Learning Rate Methods for Deep Learning", https://towardsdatascience.com/learning-rate-schedules-and-adaptive-learning-rate-methods-for-deep-learning-2c8f433990d1, Jul. 29, 2017, 18 pages.

Murdock, "How to select a threshold for acting using confidence scores", https://dev.to/jwm4/how-to-select-a-threshold-for-acting-using-confidence-scores-34cj, Apr. 21, 2020, 8 pages.

Murdock, "How to select a threshold for acting using scores", https://web.archive.org/web/20180801064756/https:/developer.ibm.com/watson/blog/2016/06/23/how-to-select-a-threshold-for-acting-using-confidence-scores/, Jun. 23, 2016, 9 pages.

* cited by examiner

UNSUPERVISED DYNAMIC CONFIDENCE THRESHOLDING FOR ANSWERING QUESTIONS

BACKGROUND

Aspects of the present invention relate generally to question answering systems and, more particularly, to unsupervised dynamic confidence thresholding for answering questions.

A question answering (QA) system is an artificial intelligence application executed on data processing hardware that answers questions pertaining to a given subject-matter domain presented in natural language. Some QA systems determine a confidence score for each determined answer for a given question and compare the confidence score to a confidence threshold in deciding whether to provide the answer to the user that asked the question. In this manner, some QA systems will only provide an answer to a question when at least one determined answer has a confidence score that exceeds the confidence threshold.

SUMMARY

In a first aspect of the invention, there is a computer-implemented method including receiving, by a question answering system having a confidence threshold, plural questions from one or more user devices. The method includes processing, by the question answering system, each respective one of the plural questions by: generating an answer to the respective one of the plural questions; determining a confidence score of the answer; in response to determining the confidence score is greater than the confidence threshold, increasing the confidence threshold and returning the answer to a respective one of the one or more user devices that generated the respective one of the plural questions; and in response to determining the confidence score is less than the confidence threshold, decreasing the confidence threshold and not returning the answer to the respective one of the one or more user devices that generated the respective one of the plural questions. The increasing the confidence threshold and the decreasing the confidence threshold are performed such that the question answering system returns answers for the plural questions at a rate that approximates the pre-defined target answering frequency by converging to a dynamic equilibrium frequency equal to that target frequency.

In another aspect of the invention, there is a computer program product including one or more computer readable storage media having program instructions collectively stored on the one or more computer readable storage media. The program instructions are executable to: receive, by a question answering system, a question from a user device; generate, by the question answering system, an answer to the question; determine, by the question answering system, a confidence score of the answer; compare, by the question answering system, the confidence score to the confidence threshold; and adjust the confidence threshold, by the question answering system and based on the comparing, by performing one of: in response to the confidence score being greater than the confidence threshold, increasing the confidence threshold for a next question; and in response to the confidence score being less than the confidence threshold, decreasing the confidence threshold for the next question.

In another aspect of the invention, there is a question answering system comprising a processor, a computer readable memory, one or more computer readable storage media, and program instructions collectively stored on the one or more computer readable storage media. The program instructions are executable to: receive input defining a target answering frequency of the question answering system; receive a question from a user device; generate one or more answers to the question; determine a respective confidence score for each of the one or more answers; determine which of the one or more answers to return to the user device based on a confidence threshold; and adjust the confidence threshold based on comparing a highest one of the respective confidence scores to the confidence threshold, wherein the adjusting the confidence threshold is performed in a manner that causes the question answering system to approximate the target answering frequency.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
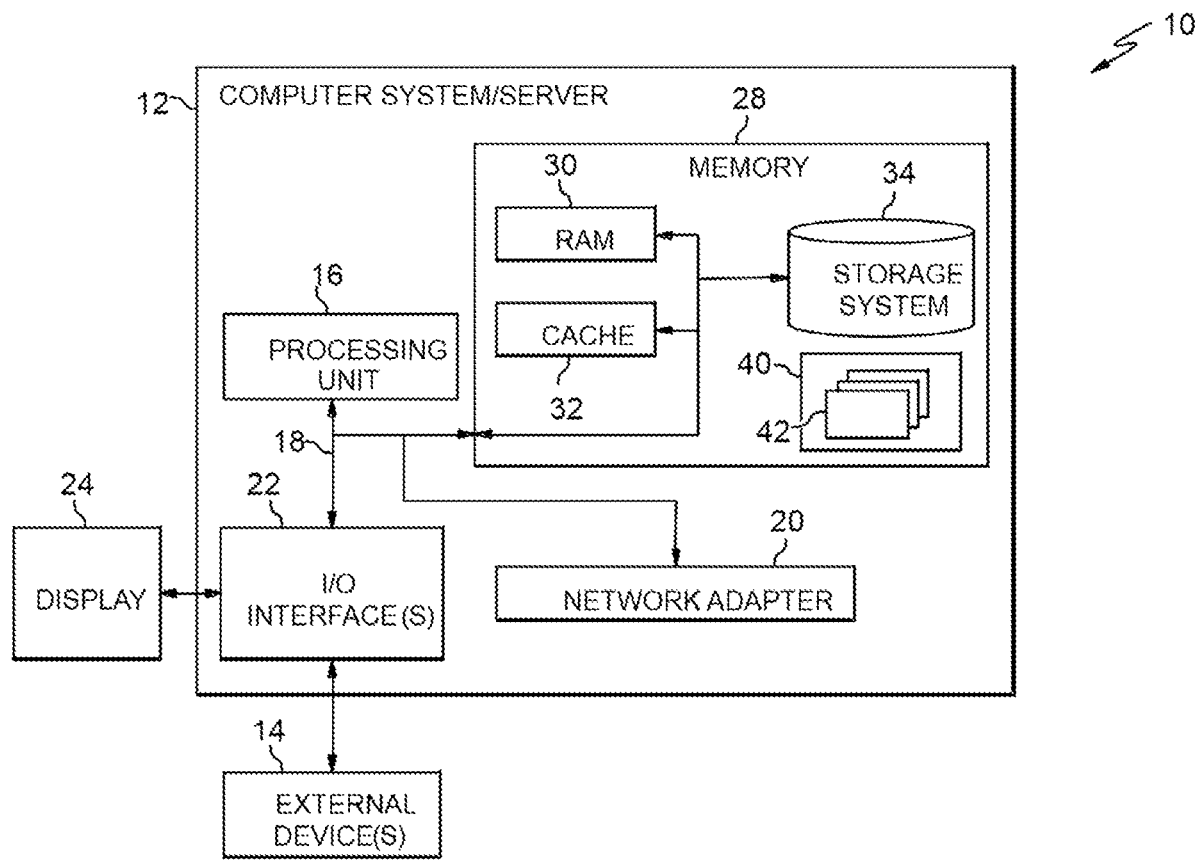
FIG. 1 depicts a cloud computing node according to an embodiment of the present invention.

Aspects of the present invention relate generally to question answering systems and, more particularly, to unsupervised dynamic confidence thresholding for answering questions. In embodiments, a question answering (QA) system receives a question from a user device, determines one or more answers for the question, returns the determined answers whose confidence score is greater than a confidence threshold, and does not return the determined answers whose confidence score is less than the confidence threshold. According to aspects of the invention, the QA system automatically and dynamically adjusts the confidence threshold to approximate a target answering frequency, which is a specified percentage of the time for which the system provides an answer to a question. In this manner, implementations of the invention learn and continually adjust a confidence threshold such that the QA system returns answers at a rate that approximates the target answering frequency and, when the QA system does return an answer, the confidence score of the answer is greater than the confidence threshold.

In accordance with aspects of the invention there is a method for automatically adjusting a confidence threshold to answer a question by a system capable of answering questions, the method comprising: receiving a target answering frequency by the system; selecting a confidence threshold for answering a question; processing iteratively a plurality of questions from a user by the system to determine for each question an answer with a confidence assessment; responsive to determining the answer has the confidence assessment above the confidence threshold returning the answer and incrementing the confidence threshold; and responsive to determining the answer has the confidence assessment below the confidence threshold, preventing returning the answer and decrementing the confidence threshold, wherein the decrementing and the incrementing are configured to approximate the target answering frequency.

Aspects of the invention provide an improvement in the technical field of QA systems. Conventional QA systems utilize static (i.e., unchanging) confidence thresholds when deciding whether to provide an answer to a question posed by a user. In many cases, users do not have data in advance that tells them what a good confidence threshold is. As a result, the static confidence threshold is often only a guess that may or may not produce satisfactory results. In some cases, however, users might have useful intuition about how frequently they want the system to provide an answer to a question. Implementations of the invention leverage this knowledge by utilizing a dynamic confidence threshold that changes over time and that is optimized to approximate the target answering frequency. This provides the improvement of achieving a desired outcome for the user (i.e., providing answers at the target answering frequency, which may be user-defined) while at the same time avoiding the disadvantages associated with a static confidence threshold.

Aspects of the invention also provide an improvement to computer functionality. In particular, implementations of the invention are directed to a specific improvement to the way QA systems operate, embodied in the continually adjusted confidence threshold that approximates a desired target answering frequency. In embodiments, the system adjusts the confidence threshold each time a question is asked, such that the confidence threshold that is applied to the next question differs from the confidence threshold that is applied to the current question. As a result of adjusting the confidence threshold for the next question based on the answer to the current question, the system increases or decreases the likelihood that the system will provide an answer for the next question. In this manner, embodiments of the invention affect how the QA system functions (i.e., the likelihood of providing an answer to a question) from one question to the next.

Aspects of the invention are also inherently computer-based and cannot practically be performed in the human mind or with pencil and paper. As described herein, QA systems perform deep analysis of the language of an input question and the language used in each of the portions of the corpus of data found during applications of queries using a variety of reasoning algorithms. There may be hundreds or even thousands of reasoning algorithms applied, each of which performs different analysis, e.g., comparisons, natural language analysis, lexical analysis, or the like, and generates a score. It is well understood in the art that such deep analysis, including the amount of data being analyzed and number of reasoning algorithms applied in the analysis, cannot practically be performed in the human mind or with pencil and paper.

As an overview, a QA system is an artificial intelligence application executed on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area (e.g., financial domain, medical domain, legal domain, etc.) where the body of knowledge (knowledge-base) can be organized in a variety of configurations, such as but not limited to a structured repository of domain-specific information, such as ontologies, or unstructured data related to the domain, or a collection of natural language documents about the domain.

Content users input questions to the QA system, and the QA system answers the input questions using the content in the corpus of data by evaluating documents, sections of documents, portions of data in the corpus, or the like. During evaluation of a given section of a document for sematic content, a variety of conventions to query such a document from the QA system may be used (for example, sending the query to the QA system as a well-formed question which is then interpreted by the QA system and a response is provided containing one or more answers to the question). Semantic content is content based on the relation between signifiers, such as words, phrases, signs, and symbols, and what they stand for, their denotation, or connotation. In other words, semantic content is content that interprets an expression, such as using natural language processing.

For example, as described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking for portions of the corpus of data that have some potential for containing a valuable response to the input question.

The QA system then performs deep analysis of the language of the input question and the language used in each of the portions of the corpus of data found during the applications of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portions of the corpus of data and evaluate its veracity.

The scores obtained from the various reasoning algorithms indicate the extent to which the potential response is inferred by the input question based on the specific area of focus of that reasoning algorithm. In some embodiments, each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information, analyzing it, and then generating answer results based on the analysis of this data. Accessing information from a corpus of data typically includes: a database query that answers questions about what is in a collection of structured records, and a search that delivers a collection of documents links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus data, and selecting answers to questions from a pool of potential answers, i.e., candidate answers. In some embodiments, the QA system receives an input question and parses the input question to extract the major features of the question, which the system uses to formulate queries that are applied to the corpus of data. Based on the application of the queries to the corpus of data, the system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. The system may then weight the scores obtained from the various reasoning against a statistical model that summarizes a level of confidence regarding the evidence that the potential response, i.e., a candidate answer is inferred by the question. This process may be repeated for each of the candidate answers to generate ranked listing of candidate answers that may be presented to the user that submitted the input question or from which a final answer is selected and presented to the user.

There are techniques for selecting an optimal static confidence threshold for answering questions when a system has labels indicating which answers are correct. These techniques can also be used with noisy approximate labels that can be derived from user behavior (e.g., clicks). However, some applications may not even have noisy approximate labels. For those applications, it is tempting to just pick a single static threshold perhaps based on guessing and informal trial and error. However, that approach can lead to a severely suboptimal threshold that either often discards correct answers or frequently inundates the user with a huge quantity of obviously wrong answers. Even when informal testing does result in an acceptable static threshold, that static threshold can cease to be acceptable over time when content or usage patterns change, leading to systematic increases and decreases in confidences.

Implementations of the invention utilize an alternative approach in which confidence thresholds are adjusted automatically to approximate a target answering frequency, i.e., a specified percentage of the time for which the system provides an answer. Of course, it is trivial to answer with a target frequency by just randomly deciding whether to answer with the given frequency as the probability. However, it is not trivial to achieve a target frequency when only answering with relatively high confidence answers and not answering with relatively low confidence answers, because that approach will maximize accuracy for that answering frequency (assuming confidence is positively correlated with correctness). As such, embodiments learn a confidence threshold such that answering only when the confidence is above that threshold does achieve approximately the target answering frequency.

According to aspects of the invention, a target answering frequency is set and then over time the system learns a confidence threshold that causes the system to answer with that target frequency. Optimal answering frequency is more stable over time and across domains than a static confidence threshold. For a question answering system with a given level of quality, the accuracy and the median confidence for answers will often vary widely from domain to domain and can change dramatically within a domain when updating the content and/or systematically altering the kinds of questions being asked (e.g., by adding a new class of users) and/or updating the algorithms that compute confidence scores. However, product designers, domain experts, and end users often are able to characterize their desired experience from a system qualitatively in terms of answering frequency. For example, someone deploying an answering system may say "I want this to provide an answer most of the time and only return nothing when confidence is very low." No single static confidence threshold can reliably produce that behavior; one that behaves this way at a particular time on a particular set of test examples will not do so when there are changes to the content, the usage, or the algorithms inside the system. Embodiments, on the other hand, learn a confidence threshold that does approximate the desired frequency and then continuously updates that threshold to ensure it continues to do so.

When building this capability into a question answering system, there are a variety of alternative user experiences that can be provided to a customer trying to create a specific instance of this service. Examples include the following.

In a first example, the dynamic confidence thresholding (e.g., automatically and dynamically adjusting the confidence threshold to approximate a target answering frequency while only returning answers above the confidence threshold, as described herein) is a feature that is always turned on (e.g., cannot be turned off by customers) and is programmed with fixed configuration options that question-answering engine developers believe are a good fit for many customers.

In a second example, an interface that a customer utilizes to ask questions to the QA system has a toggle to turn the dynamic confidence thresholding on and off. In this example, when the customer turns off the dynamic confidence thresholding, the QA system may be configured to instead use a static confidence threshold or no confidence threshold. This might be a good option for customers that find the always-on behavior to be unsatisfactory because it makes the behavior of the system more unpredictable (since that behavior changes over time as the system learns from experience).

In a third example, an interface that a customer utilizes to ask questions to the QA system permits the customer to define the target answering frequency. This feature could be an advanced configuration parameter with a reasonable default, for example. In this example, the system may permit the customer to specify the target answering frequency as a number. Alternatively, the system may permit the customer to select from an enumerated list of labeled examples that correspond to numbers (e.g., "moderately cautious" means answer 30% of the time, "moderately ambitious" means answer 70% of the time, etc.). Alternatively, the system may permit both, for example, by allowing the customer to enter a number or select from a list of labeled examples.

In a fourth example, an interface that a customer utilizes to ask questions to the QA system permits the customer to define a learning rate, which is described herein. This feature could be an advanced configuration parameter with a reasonable default, for example. This feature could also be combined with the feature of letting the customer define the target answering frequency.

In a fifth example, the QA system permits the customer to specify a set of seed queries for calibrating the confidence threshold. For some customers, this feature may be easier than relevancy training, because the customer only needs to specify the seed queries, not say what answers are correct for those seed queries. This feature can be used to speed up finding an acceptable confidence threshold.

An exemplary implementation of the invention is embodied in a method that includes selecting a target answering frequency, selecting an initial threshold, and repeatedly doing the following: receiving questions from a user, finding answers, and assigning confidence to those answers; when the answer has confidence above a threshold, provide that answer but also incrementally increase the threshold so that the system is less likely to answer future questions; when the answer has confidence below a threshold, do not provide that answer and also incrementally decrease the threshold so that the system is more likely to answer future questions; control the increasing and the decreasing of the threshold to ensure that the frequency with which the system answers approximates the target answering frequency. In a particular exemplary embodiment, the method has two parameters: the target answering frequency "f" and the learning rate "alpha". In this example, the confidence threshold is initially set at $t=1-f$, and alpha is set at any number greater than 0 and less than 1. In this example, when the confidence of the top answer is above t, then show all answers with confidence greater or equal to the threshold and then set $t=t+alpha*(1-f)$. In this example, when the confidence of the top answer is below t, show no answers and then set $t=t-alpha*f$.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
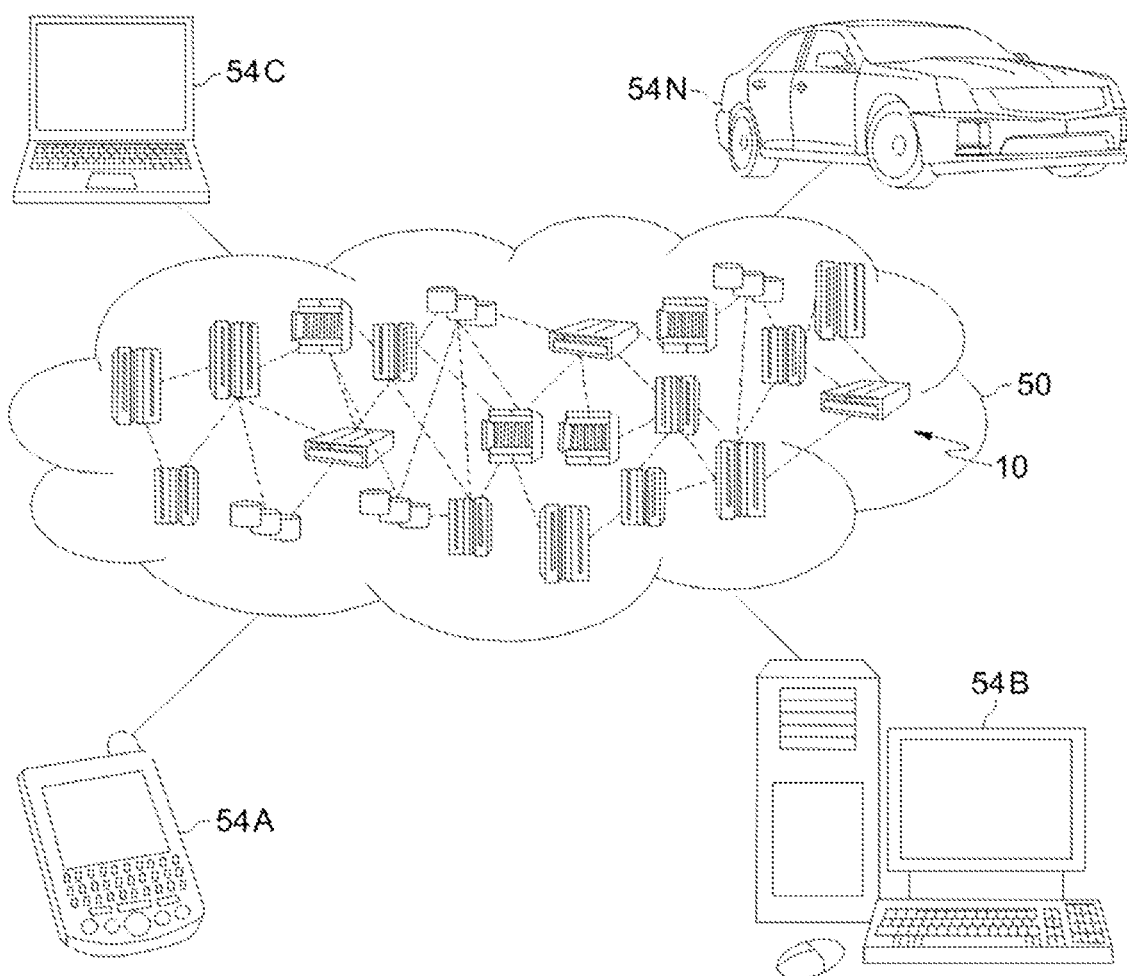
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
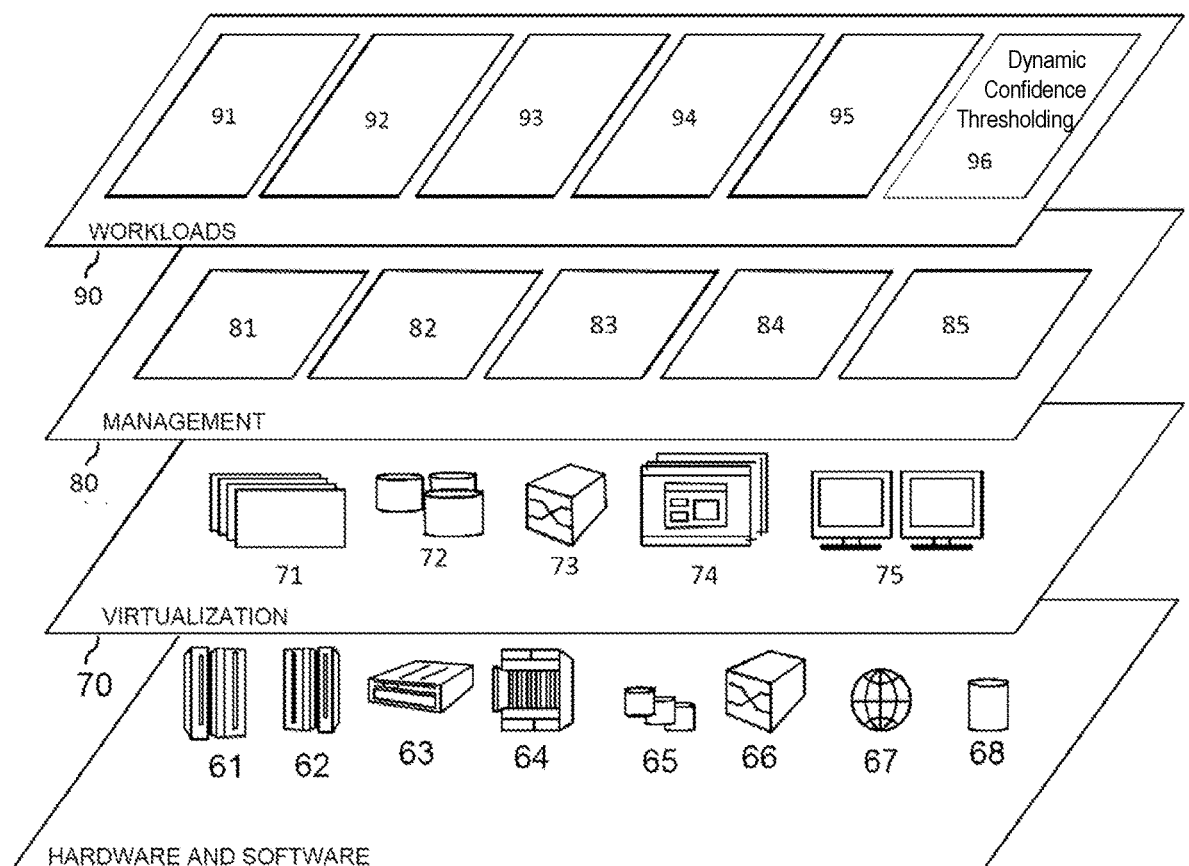
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic confidence thresholding 96.

Implementations of the invention may include a computer system/server 12 of FIG. 1 in which one or more of the program modules 42 are configured to perform (or cause the computer system/server 12 to perform) one or more functions of the dynamic confidence thresholding 96 of FIG. 3. For example, the one or more of the program modules 42 may be configured to: receive input defining a target answering frequency of a question answering system; receive a question from a user device; generate one or more answers to the question; determine a respective confidence score for each of the one or more answers; determine which of the one or more answers to return to the user device based on a confidence threshold; and adjust the confidence threshold based on comparing a highest one of the respective confidence scores to the confidence threshold, wherein the adjusting the confidence threshold is performed in a manner that causes the question answering system to approximate the target answering frequency.

Figure 4:
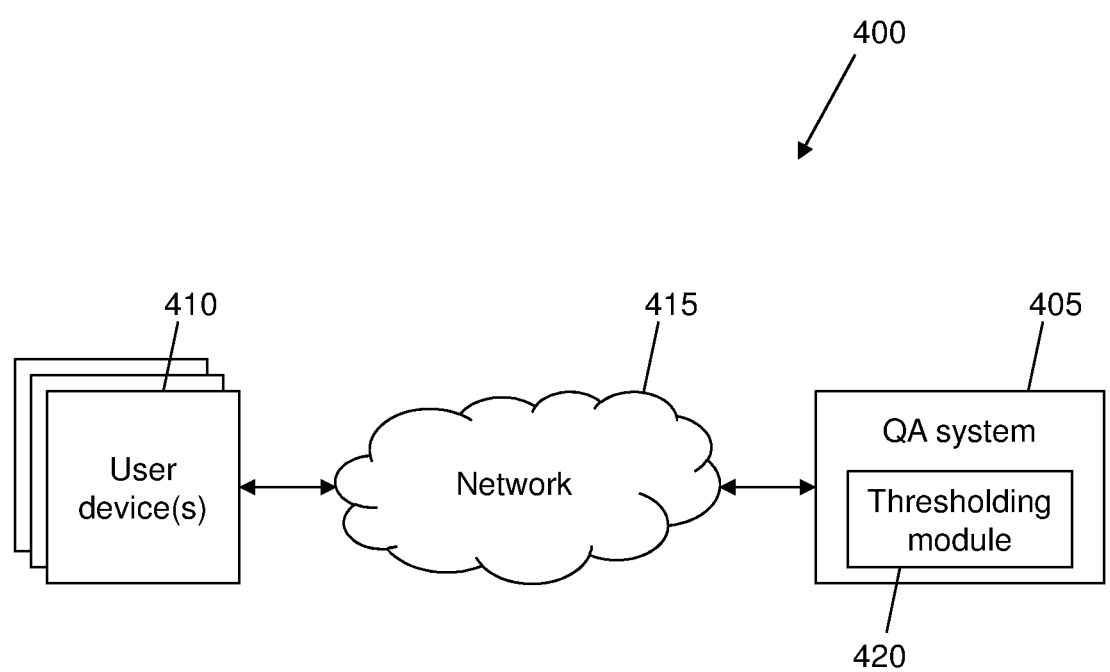
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a question answering (QA) system 405 and one or more user devices 410 connected via a network 415. The QA system 405 includes one or more computing devices (such as the computer system/server 12 of FIG. 1) and a corpus of electronic documents, and is configured to generate a ranked list of answers (and a confidence score associated with each answer) in response to a question asked via one of the user devices 410.

Each of the one or more user devices 410 comprises a computer device (such as the computer system/server 12 of FIG. 1), and may include, for example, a desktop computer, a laptop computer, a tablet computer, a smartphone, or a smart speaker. In embodiments, each of the one or more user devices 410 comprises a user interface that is configured to: permit a user to provide input that defines a question; and output an answer (or answers) to the question, the answer (or answers) having been determined by the QA system 405. The interface may include a visual interface (e.g., a visual display screen), an audio interface (e.g., a microphone and speaker), or both.

In embodiments, the network 415 includes one or more communication networks such as one or more of a LAN, a WAN, and the Internet. In a cloud implementation, the network 415 is part of the cloud computing environment 50 of FIG. 2, the user devices 410 correspond to respective one of the computing devices 54A-N shown in FIG. 2, and the QA system 405 corresponds to one or more cloud computing nodes 10 shown in FIG. 2.

According to aspects of the invention, the QA system 405 includes a thresholding module 420 that is configured to automatically and dynamically adjust a confidence threshold that serves as the basis of a comparison with a confidence score of an answer generated by the QA system 405 when determining whether to present the answer to the user that asked the question. In embodiments, the thresholding module 420 adjusts the confidence threshold to approximate a predefined target answering frequency.

Figure 5A:
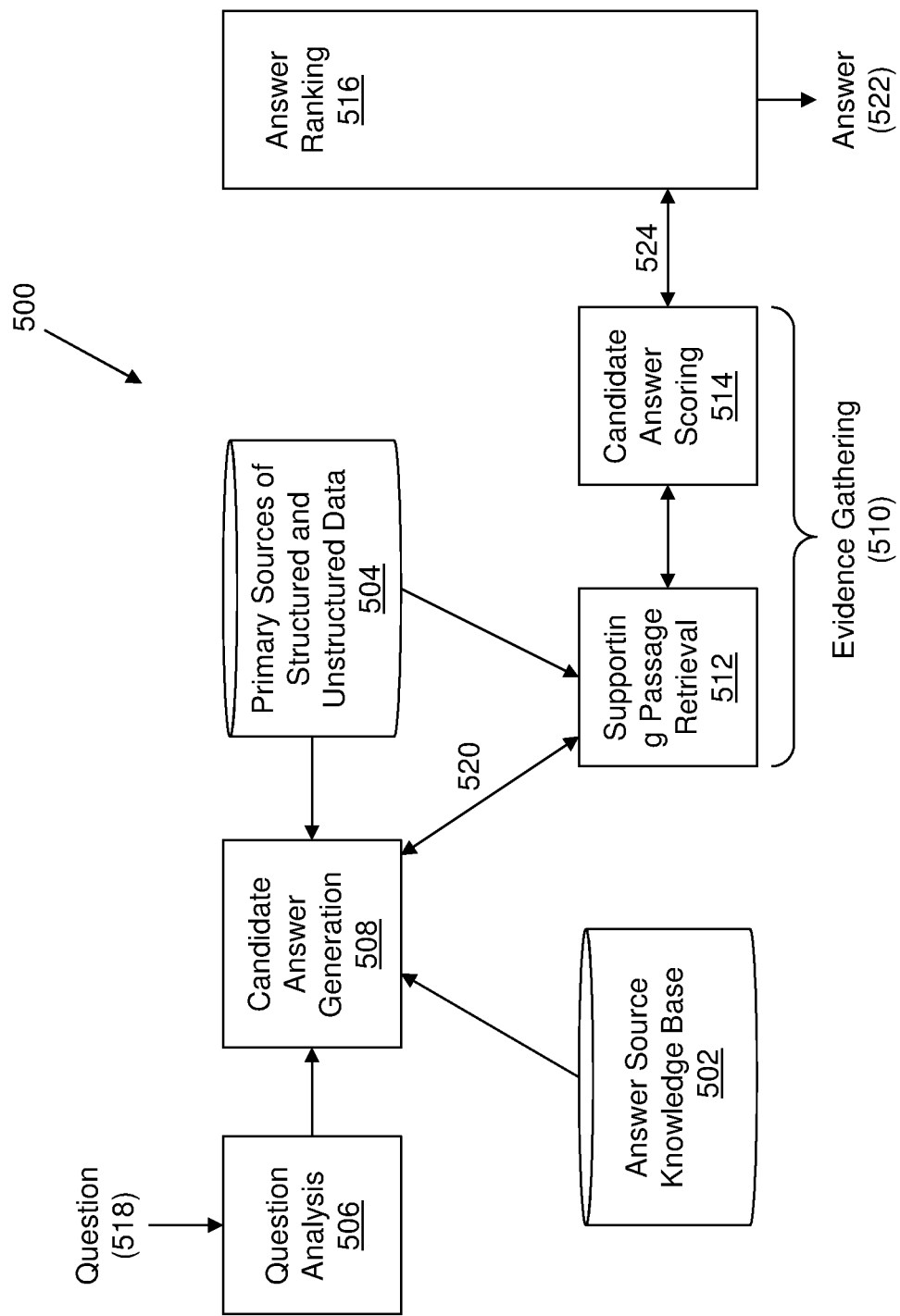
FIG. 5A shows a system diagram providing an exemplary architecture of a question answering system in accordance with aspects of the invention.
Figure 5B:
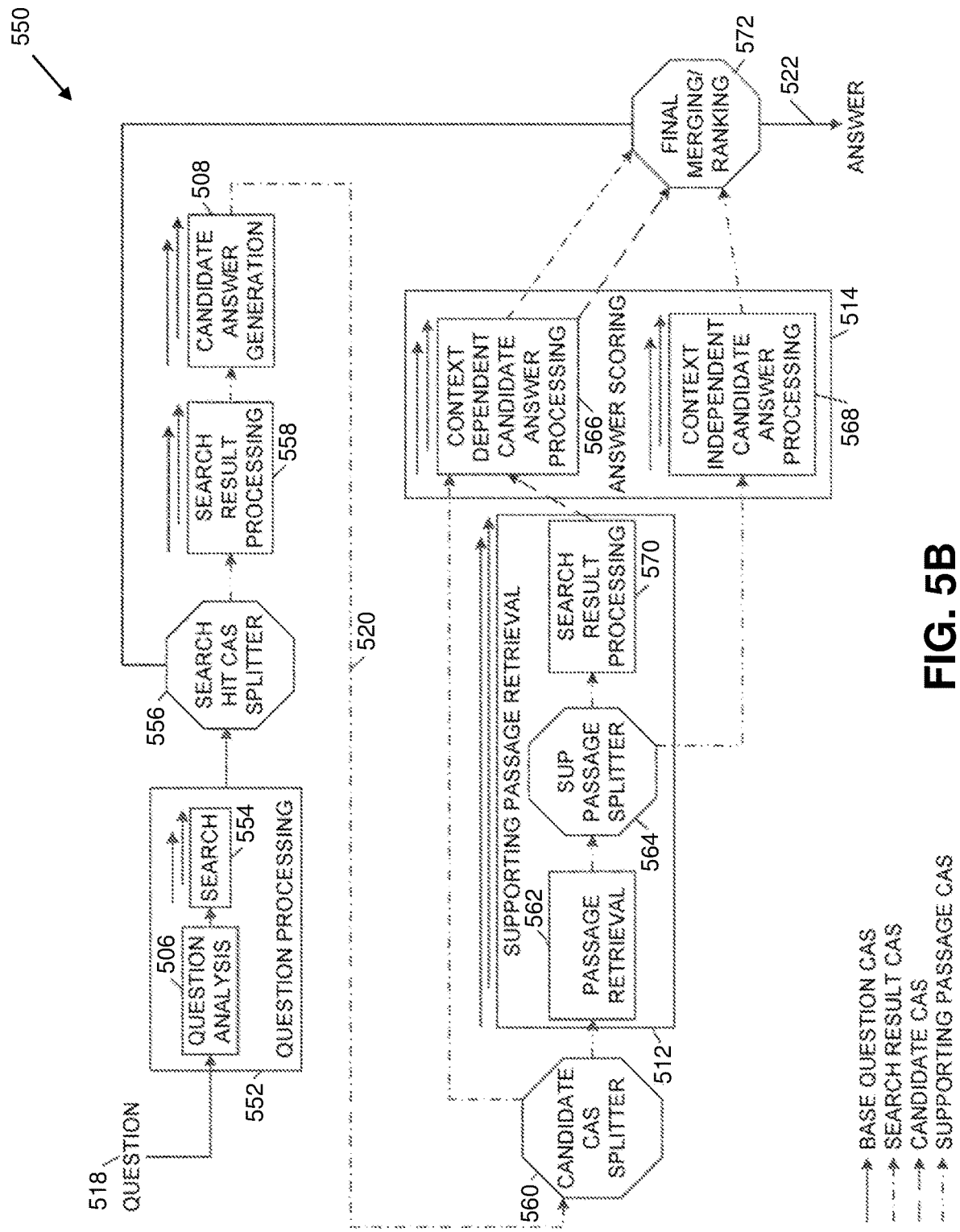
FIG. 5B is an operation diagram of the architecture shown in FIG. 5A in accordance with aspects of the invention.

In a particular exemplary embodiment, the QA system 405 includes the thresholding module 420 (shown in FIG. 4) and the modules shown in FIGS. 5A and 5B (described herein). Each module may comprise one or more program modules such as program modules 42 described with respect to FIG. 1. The QA system 405 may include additional or fewer modules than those shown. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

FIG. 5A shows a system diagram providing an exemplary architecture 500 of the QA system 405 in accordance with some embodiments. The system shown in FIG. 5A includes an answer source knowledge base 502, primary sources of structured and unstructured data 504, a question analysis module 506, a candidate answer generation module 508, an evidence gathering module 510 (including a supporting passage retrieval module 512 and a candidate answer scoring module 514), and an answer ranking module 516. In embodiments, the question analysis module 506 implements functions for receiving and analyzing a user query or question. According to some embodiments, a "user" refers to a person or persons interacting with QA system 405, and the term "user query" refers to a question (and its context) 518 posed by the user. However, as used herein, the term "user" may also refer to a user device 410 generating a question by electronic means and where the term "user query" refers to such an electronically generated question. In embodiments, the candidate answer generation module 508 generates a plurality of output data structures containing candidate answers based upon the analysis of retrieved data. In embodiments, the evidence gathering module 510 interfaces with the corpus of electronic documents, including the answer source knowledge base 502 and the primary sources of structured and unstructured data 504, for concurrently analyzing the evidence based on passages having candidate answers, and scoring each of the candidate answers as parallel processing operations.

In embodiments, the candidate answer generation module 508 is configured to generate a query and run the query against the primary sources of structured and unstructured data 504 in the (local and distributed) sources database or like memory storage device(s). This query may be run against structured data (e.g., the knowledge base), semi-structured (e.g., Wikipedia, IMDB databases, a collection of SEC filings in XBRL, etc.), or unstructured data (text repositories) to generate a candidate answer list 520.

In some embodiments, the architecture 500 in FIG. 5A uses Common Analysis System (CAS) candidate answer structures and may implement supporting passage retrieval as will be described in greater detail herein below. This processing is depicted in FIG. 5A where the evidence gathering module 510 comprises the supporting passage retrieval module 512 and the candidate answer scoring module 514 as separate processing modules for concurrently analyzing the passages and scoring each of the candidate answers as parallel processing operations. In embodiments, the answer source knowledge base 502 (part of the corpus of electronic documents that are part of the QA system 405) comprises one or more databases of structured or semi-structured sources (pre-computed or otherwise) comprising collections of relations (e.g., typed lists). In an example implementation, the answer source knowledge base 502 comprises a database stored in a memory storage system, e.g., a hard drive. In embodiments, the answer ranking module 516 provides functionality for ranking candidate answers and determining an answer 522 that is returned to a user via a display interface (not shown) provided by a user device 410. The answer 522 may be an answer or an elaboration of a prior answer or request for clarification in response to a question when a highly qualified answer to the question is not found.

As described above, in some embodiments the architecture 500 uses the Common Analysis System (CAS), a subsystem of the Unstructured Information Management Architecture (UIMA), that handles data exchanges between the various UIMA components, such as analysis engines and unstructured information management applications. CAS supports data modeling independent of programming language, provides data access through a powerful indexing mechanism, and provides support for creating annotations on text data. CAS also allows for multiple definitions of the linkage between a document and its annotations, as is useful for the analysis of images, video, or other non-textual modalities.

In embodiments, the architecture 500 implements multiple parallel processing modules to compute the scores of the candidate answers with the scores provided in CAS-type data structures 524 based on various criteria. For instance, the criteria may consider whether the answer satisfies similar lexical and semantic relations, how well the answer and the query align, how well the terms match and do the terms exist in similar order, etc. Thus, it is understood that multiple modules are used to process different candidate answers and thus, potentially provide many scores in accordance with the number of potential scoring modules.

Still referring to FIG. 5A, in embodiments the answer ranking module 516 receives a plurality of CAS type of data structures 524 output from the evidence gathering module 510 and generates a score for each candidate answer. In embodiments, the score is a confidence score that can be used to rank plural answers and that can be compared to a confidence threshold.

FIG. 5B is an operation diagram 550 of the architecture 500 shown in FIG. 5A in accordance with some embodiments. FIG. 5B also represents a data model defining the data structures supplied as input to, or produced as output by, the system components shown in FIG. 5A. As shown in FIG. 5B, a question processing module 552 receives an input that comprises a question 518 entered, for example, by a user via user device 410. The question processing module 552 includes the question analysis module 506 and a search engine 554. The search engine 554 may include searching primary structured and unstructured sources, e.g., an Internet search, a local copy of Wikipedia, or a database look-up. In embodiments, the search engine 554 has a query generator that generates an engine-specific query from the abstract query and formats it in the query syntax for the search engine and then processes the query and adds a search result hit-list to the CAS type of data structure. A search object contains the search engine query, an identifier for the search engine, and the search results. As represented in FIG. 5B, the data in the example CAS type data structure are output of the search engine 554 of the question analysis processing module 552 and may be processed in parallel. In embodiments, a search hit CAS splitter 556 initiates a parallel search for candidate answers. For parallel operations, the search list (search result passages) are distributed by the search hit CAS splitter 556 so that concurrent processing in search result processing module 558 are applied (work divided) to process each of the found search results and to perform candidate answer generation (in parallel) using the techniques described herein in the candidate answer generation module 508.

In embodiments, the output of the candidate answer generation module 508 (i.e., the candidate answer list 520) is processed in parallel by a candidate CAS splitter 560, which is used to parallelize the candidate answers for input to the supporting passage retrieval module 512. In embodiments, for each set of candidate answers, the CAS type of data structure is split into separate CAS type of data structures such that each CAS type of data structure includes one or more candidate answers and is sent to the supporting passage retrieval module 512 and the candidate answer scoring module 514.

With continued reference to FIG. 5B, functionality is initiated after the candidate CAS splitter 560 at passage retrieval module 562, which retrieves supporting passages. In embodiments, the supporting passage splitter 564 splits supporting passage records created by the passage retrieval module 562. In one example, since there may be many such supporting passage records, the supporting passage splitter 564 routes the new CAS type data structures (with all information that was computed previously: context, query, candidate answer, supporting passage) to the candidate answer scoring module 514.

In embodiments, the results contain one or more CAS type of data structures containing (among other elements) the three items: a candidate answer, the question terms, and a supporting passage. Since thousands of such CAS type data structures can be generated per one question, these candidates are scored in parallel in some implementations. In an embodiment, the candidate scoring performed by the candidate answer scoring module 514 is divided into two classes: a context dependent candidate answer processing module 566 (where the answer score depends on the passage content) and a context independent candidate answer processing module 568 (where the answer is scored independently of the passage). For example, if the candidate answer is obtained from the document title, the score may not be dependent on the content of the passage, and, thus, are context independent. In contrast, other types of candidate answer scoring based on text alignment, grammatical relations, or lexical and semantic relations may involve a comparison between the query and the passage, and, thus, are context dependent. In embodiments, since some of these methods may depend on the computation of grammatical and semantic relations in the passage, an optional search result processing module 570 processes search results prior to context dependent candidate answer processing in module 566.

In embodiments, the results of the candidate answer scoring module 514 are saved using the CAS data structure. During the final merging and ranking at step 572, the answer ranking module 516 aggregates and merges candidate answer features and applies a final candidate answer scoring function to generate a final score for an answer 522 (or answers). In embodiments, the score of a particular answer is a confidence score that indicates a relative measure of confidence that the answer is correct. For example, the score may be a value between 0.0 and 1.0, with 0.0 representing a lowest confidence and 1.0 representing a highest confidence, with the measure of confidence increasing linearly between 0.0 and 1.0.

Referring back to FIG. 4, in accordance with aspects of the invention the QA system 405 receives a question from one of the user devices 410, determines one or more answers to the question and a respective confidence score for each of the one or more answers (e.g., using the architecture shown in FIGS. 5A and 5B or some other QA system architecture), compares the highest confidence score of the one or more answers to a confidence threshold, and adjusts the confidence threshold based on the comparison. In embodiments, the thresholding module 420 performs the comparing and the adjusting. When the highest confidence score of the one or more answers is greater than the confidence threshold, the thresholding module 420 provides the answer associated with the highest confidence score to the user device 410 that asked the question, and also incrementally increases the confidence threshold so that the QA system 405 is less likely to answer the next question asked via one of the user devices 410. When the highest confidence score of the one or more answers is less than the confidence threshold, the thresholding module 420 does not provide any of the one or more answers to the user device 410 that asked the question, and also incrementally decreases the confidence threshold so that the QA system 405 is more likely to answer the next question asked via one of the user devices 410.

In embodiments, the thresholding module 420 increases the confidence threshold according to a first algorithm comprising a first function of a target answering frequency ("f"), a learning rate ("alpha"), and a current threshold value ("t"). An example of the first algorithm is shown in expression (1) as:

$$t\_new = t + alpha*(1-f) \quad (1)$$

In embodiments, the thresholding module 420 decreases the confidence threshold according to a second algorithm comprising a second function of the target answering frequency ("f"), the learning rate ("alpha"), and the current threshold value ("t"), the second function being different than the first function. An example of the second algorithm is shown in expression (2) as:

$$t\_new = t - alpha*f \quad (2)$$

In both expressions (1) and (2) "t" is the current value of the confidence threshold that is used in the comparison to the confidence score of the answer of the current question, and "t_new" is a new value of the confidence threshold that will be used in a comparison to the confidence score of the answer of the next question presented to the QA system 405.

Table 1 shows an example use case of the thresholding module 420 adjusting the confidence threshold "t" over successive questions posed to the QA system 405 (e.g., asked via user devices 410). In the example use case, the target answering frequency ("f") is 0.4 and the learning rate "alpha" is 0.02, although these values are not limiting, and other values greater than 0 and less than 1 may be used. The confidence threshold "t" is initially set at a value of 1−f, which is 1−0.4=0.6 in this example, although this initial setting is not limiting, and other initial settings may be used. For the first question (Question 1), the QA system 405 determines an answer with a confidence score of 0.420, e.g., using the techniques described with respect to FIGS. 5A and 5B. According to aspects of the invention, the thresholding module 420 compares this confidence score (0.420) to the current confidence threshold (0.600) and determines that the confidence score is less than the confidence threshold. As a result of determining the confidence score is less than the confidence threshold for Question 1, the thresholding module 420 adjusts the confidence threshold downward using expression (2) to determine t_new (0.592). The thresholding module 420 then sets this determined value of t_new (0.592) as the value of the confidence threshold "t" for the next question, i.e., Question 2.

TABLE 1

| Question | confidence | t | t_new |
|---|---|---|---|
| 1 | 0.420 | 0.600 | 0.592 |
| 2 | 0.750 | 0.592 | 0.604 |
| 3 | 0.800 | 0.604 | 0.616 |
| 4 | 0.330 | 0.616 | 0.608 |
| 5 | 0.380 | 0.608 | 0.600 |
| 6 | 0.640 | 0.600 | 0.612 |

Still referring to the exemplary use case depicted in Table 1, for the second question (Question 2), the QA system 405 determines an answer with a confidence score of 0.750, e.g., using the techniques described with respect to FIGS. 5A and 5B. According to aspects of the invention, the thresholding module 420 compares this confidence score (0.750) to the current confidence threshold (0.592) and determines that the confidence score is greater than the confidence threshold. As a result of determining the confidence score is greater than the confidence threshold for Question 2, the thresholding module 420 adjusts the confidence threshold upward using expression (1) to determine t_new (0.604). The thresholding module 420 then sets this determined value of t_new (0.604) as the value of the confidence threshold "t" for the next question, i.e., Question 3. In embodiments, and as demonstrated in the exemplary use case shown in Table 1, the thresholding module 420 continually adjusts the confidence threshold for each successive question by: comparing the current confidence threshold to the confidence score of the answer of the current question; and determining t_new (the value of the confidence threshold for the next question) using either (i) a first algorithm that increases the confidence threshold when the confidence score of the answer of the current question is greater than the current confidence threshold or (ii) a second algorithm that decreases the confidence threshold when the confidence score of the answer of the current question is less than the current confidence threshold.

Aspects of the invention are not limited to using expressions (1) and (2) as the algorithms for adjusting the confidence threshold. Other algorithms may be used provided that the algorithms are based on the current value of the confidence threshold and a target answering frequency and provided that the algorithms function to approximate the target answering frequency by: incrementally increasing the confidence threshold when the highest confidence score of the one or more answers is greater than the confidence threshold so that the system is less likely to answer the next question; and incrementally decreasing the confidence threshold when the highest confidence score of the one or more answers is less than the confidence threshold so that the system is more likely to answer the next question.

In embodiments, approximating a target answering frequency as used herein means that, for plural questions (e.g., hundreds or even thousands of questions), the QA system 405 provides at least one answer for a first percentage of the plural questions and does not provide an answer for a second percentage of the plural questions, and the first percentage substantially equals the predefined target answering frequency. Substantially equals in this context means within a tolerance, such as plus or minus 1 percent, for example. For instance, in one example, the target answering frequency is set at 77%, and the QA system approximates the target answering frequency when it provides an answer on average between 76% and 78% of the time for plural questions.

The following is a proof that using expressions (1) and (2) as the algorithms for adjusting the confidence threshold reaches a dynamic equilibrium in which f is the frequency with which the QA system 405 shows at least one answer. In the proof, the notation p(*) indicates probability.

For any single query, the expected value of t after a single query is: t+p(top-answer-confidence-above-t)*alpha*(1−f)−p(not(top-answer-confidence-above-t))*alpha*f.

Assume that t is the threshold for having at least one answer with frequency f. Then it follows that p(top-answer-confidence-above-t)=f and p(not(top-answer-confidence-above-t))=1−f.

Therefore, the expected value of t after a query is t+f*alpha*(1−f)−(1−f)*alpha*f=t.

This means there is a dynamic equilibrium with t at the threshold for having at least one answer with frequency f.

Assume that t is above the threshold for having at least one answer with frequency f. Then it follows that p(top-answer-confidence-above-t)=g and p(not(top-answer-confidence-above-t))=1−g, where g<f because a higher threshold results in lower probability that the answer is above threshold.

Therefore, the expected value of t after a query is t+g*alpha*(1−f)−(1−g)*alpha*f=t+alpha*g−alpha*g*f−alpha*f+alpha*g*f=t−alpha*(g−f).

Since alpha must be greater than 0 and g<f, setting t=t−alpha*(g−f) results in the value of t going down.

Thus, whenever t is above the threshold for having at least one answer with frequency f, it tends to go down.

Assume that t is below the threshold for having at least one answer with frequency f. It follows that p(top-answer-confidence-above-t)=g and p(not(top-answer-confidence-above-t))=1−g, where g>f because a lower threshold results in higher probability that the answer is above threshold.

As above, the expected value of t after a query is t+g*alpha*(1−f)−(1−g)*alpha*f=t+alpha*g−alpha*g*f−alpha*f+alpha*g*f=t−alpha*(g−f).

Since alpha must be greater than 0 and g>f, setting t=t−alpha*(g−f) results in the value of t going up.

Thus, whenever t is below the threshold for having at least one answer with frequency f, it tends to go up.

Thus, it is shown that t tends to move toward a threshold for which it shows at least one answer with frequency f, and that when it gets there, it reaches an equilibrium.

The proof described above assumes that the probability of an answer having confidence of exactly t is 0, which is true when the confidence scores are real numbers and randomly distributed. The proof described above also assumes that the operating environment is unchanging (e.g., if p(top-answer-confidence-above-t)=f is true for some value of t at some time, it will continue to be true forever). In practice, operating environments do change, e.g., new users can enter the user population and ask questions that are systematically different from the ones the old users asked. However, in practice such changes are likely to be gradual and/or infrequent. If the equilibrium threshold changes over time, this approach will continue to adjust the system threshold toward that equilibrium threshold as long as the system is getting sufficient usage.

Seeding the Dynamic Confidence Threshold

In embodiments, a user provides a set of seed queries (also referred to herein as seed questions) to the QA system 405 for the purpose of moving the confidence threshold closer to its equilibrium value prior to exposing the QA system 405 to a set of other users. In one example, an enterprise (e.g., a bank) wishes to use the QA system 405, with data supplied by the enterprise, to permit customers of the enterprise to ask questions that the QA system 405 answers using the data supplied by the enterprise. In this example, prior to providing the enterprise customers access to the QA system 405, a user associated with the enterprise asks a number of seed questions to the QA system 405 (e.g., using a user device 410). In this example, the user asking the seed questions is not necessarily concerned with the answers they receive from the QA system 405, but instead is asking the seed questions so that the QA system 405 will adjust the confidence threshold from an initial value closer to an equilibrium value that equals the target answering frequency, e.g., by applying the first and second algorithms a number of times as described herein. In this example, after this asking of the seed questions, the enterprise exposes the QA system 405 to its customers so that the customers can ask questions to the QA system 405 via their user devices 410. In this example, the customers are a target audience and the user that asks the seed questions is not part of the target audience.

Adjusting the Learning Rate

In embodiments, and as previously described, "alpha" is a learning rate in the algorithms that the QA system 405 uses to adjust the confidence threshold. If alpha is too low, then it can take many queries before the QA system 405 adjusts the confidence threshold to an equilibrium level, and during that time the QA system 405 might be responding too often or not often enough. Setting alpha too high can cause the QA system 405 to adjust the confidence threshold in a manner that causes the confidence threshold to oscillate wildly around the equilibrium level. A too high alpha does still result in matching the target answering frequency quite closely in the long run, but it can do so by going through stretches of being much too cautious and then balancing those out with other stretches of being much too incautious, with users during both such stretches getting inferior results.

In some implementations, the QA system 405 adjusts the learning rate over time. In embodiments, the thresholding module 420 adjusts alpha using an exponential decay function that includes an initial learning rate ("aplha0"), a fixed constant decay rate ("aplhaDecay"), and a minimum learning rate ("alphaMin"). Expression (3) shows an example of an exponential decay function that may be used by the thresholding module 420 in this manner.

$$\text{alpha\_new} = \max((\text{alpha} * \text{alphaDecay}), \text{alphaMin}) \quad (3)$$

In expression (3) "alpha" is the current value of the learning rate that is used in either expression (1) or expression (2) for adjusting the confidence threshold for the current question, and "alpha_new" is a new value of the learning rate that will be used in either expression (1) or expression (2) for adjusting the confidence threshold for the next question asked to the QA system 405. In this example, the value of alpha starts at alpha0 and decreases by a fixed amount (dictated by alphaDecay) during each question asked to the QA system, until such time as the current value of alpha during a question is less than or equal to alphaMin, at which time the value of alpha becomes fixed at the value of alphaMin. In one particular example, alpha0 is set at 0.1, alphaDecay is set at 0.95, and alphaMin is set at 0.005, although other values may be used. In one embodiment, alphaMin is set to a value greater than 0 so that the learning rate never goes to 0, since maintaining an alpha greater than 0 permits the QA system 405 to continue to react to changes in the operating environment (e.g., by continuing to adjust the confidence threshold t using expressions (1) and (2) with a non-zero value of alpha). Implementations of the invention are not limited to the function shown in expression (3), and instead the thresholding module 420 may use other exponential decay functions to adjust alpha over successive iterations of the QA system 405.

Multiple Answers

In some embodiments, the QA system 405 is programmed to determine only a single answer for a particular question, determine a confidence score for the single answer, and compare the confidence score of the answer to the confidence threshold in the manner described herein. In other embodiments (referred to herein as multiple answer embodiments), the QA system 405 is programmed to determine plural answers for a single question, and to determine a respective confidence score for each of the plural answers. Implementations of a multiple answer embodiment may utilize different techniques for determine which of the plural answers to return to the user that asked the question. A first technique is to compare the respective confidence score of each of the plural answers to the confidence threshold, and to return all the answers whose confidence score is greater than the confidence threshold. A second technique is to determine a discounted confidence score for each of the plural answers, compare the respective discounted confidence score of each of the plural answers to the confidence threshold, and return all the answers whose discounted confidence score is greater than the confidence threshold. This section describes techniques for determining two different discounted confidence scores: an independence discounted confidence score and a redundancy discounted confidence score.

At the outset, it may seem non-intuitive to use a threshold that was learned exclusively on top answers to also determine whether to respond with later answers (even after discounting those later answers). However, the rationale for doing so is as follows: a benefit of learning a threshold to fit a target answering frequency is that creators of answering systems have a useful intuition about the answering frequency that will make end-users happy; implicit in the target answering frequency is some trade-off between the positive utility of providing a right answer and the negative utility of providing a wrong answer; since the dynamic thresholding method converges to the target answering frequency, it encodes that trade-off and provides an equilibrium threshold that is optimal under the assumption that the target answering frequency is optimal; if the positive utility of providing a right answer and the negative utility of providing a wrong answer is roughly the same for lower ranked answers as it is for top-ranked answers, then the threshold that is optimal for the lower ranked answers will still be optimal for the higher ranked answers.

With all that said, in many question answering applications, it is not appropriate to assume that utilities are roughly the same for lower ranked answers. Most questions only have one correct semantic answer, so if there are multiple correct answer texts, they are probably fairly redundant (e.g., different texts that express roughly the same meaning). For many applications, one can roughly assume that only the first correct answer provides real positive utility and any additional correct answers are redundant. That assumption may not be totally true in all cases (for example, some questions have multiple correct semantic answers; also, some answer texts may be correct but incomplete so they can be complemented by additional answer texts). However, it is closer to being true than the reverse assumption that all correct answers are non-redundant, so for purposes of setting optimal thresholds, it is better to assume multiple correct answers are typically redundant. With that assumption, one would generally treat only the first correct answer to each question as having positive utility.

In embodiments, if confidences are estimates of probabilities that an answer is correct and if these probabilities are independent, then the system estimates that some answer is correct and that all higher ranked answers are incorrect as the confidence in that answer times the product of one minus the confidence of each higher ranked answer. This is referred to in embodiments as an independence discounted confidence score. For example, if the top three answers to a question have respective confidence scores of 0.4, 0.3, and 0.2, then the QA system 405 estimates that the probability that the third ranked answer (having a confidence score of 0.2 in this example) is not just correct but also the first correct answer is $0.2*(1-0.4)*(1-0.3)=0.084$. In this same example, the QA system 405 estimates that the probability that the second ranked answer (having a confidence score of 0.3 in this example) is not just correct but also the first correct answer is $0.3*(1-0.4)=0.18$. In this same example, the QA system 405 estimates that the probability that the first ranked answer (having a confidence score of 0.4 in this example) is not just correct but also the first correct answer is 0.4 (since there are no higher ranked answers). In this manner, the QA system 405 determines that the answers having respective confidence scores of 0.4, 0.3, and 0.2 also have respective independence discounted confidence scores of 0.4, 0.18, and 0.084. In embodiments, the QA system 405 compares the independence discounted confidence score of each answer to the confidence threshold and returns to the user only those answers whose independence discounted confidence score is greater than the confidence threshold.

In some domains, the assumption that the probabilities of correctness are independent is not accurate. For example, in customer care applications where answers are often highly curated content designed to have minimal redundancy, it is advantageous to have the system do less discounting. For example, in one extreme case where there is no redundant content (i.e., that the conditional probability of one answer being correct given that another answer is correct is 0), then the probability that an answer is the top correct answer is just the probability that it is correct, so there is no need for any discounting. In contrast, question answering across a diverse collection of sources from independent authors tends to result in more positively correlated answers. In another extreme case in which the conditional probability of an answer being correct given that another answer is correct is 1, then the probability of any answer other than the top answer being the top correct answer is 0 (meaning the system would always discount all confidences of non-top-answers to 0 and only ever answer with the one top answer).

In practice, while the actual conditional probabilities between answers is unknown, it is possible to estimate a level of redundancy in the corpus. For example, if "c" is the original confidence score for some non-top answer, and "i" is the independence discounted confidence score for the same answer (determined as described above), then in embodiments the QA system 405 is configured to determine a redundancy discounted confidence score for this answer according to the formula: $c*(c/i)^{(-r)}$, where "r" is a redundancy discounting factor. When "r" is selected to have a value of 0, this formula returns the redundancy discounted confidence score as being equal to "c" (i.e., the original confidence score of this answer). When "r" is selected to have a value of 1, this formula returns the redundancy discounted confidence score as being equal to "i" (i.e., the independence discounted confidence score of this answer). In the limit as the value of "r" goes to infinity the redundancy discounted confidence score given by the formula goes to 0. This technique provides a continuous approach to computing discounted confidences for intermediate levels of redundancy. For example, when "r" is selected to have a value of 0.5, this amounts to roughly halfway between assuming no redundancy and independence and, thus, provides a redundancy discounted confidence score that is somewhere between the values of "c" and "i".

With continued reference to the redundancy discounted confidence score, in embodiments the QA system 405 is configured to receive user input that defines the value of the redundancy discounting factor "r". In a first example, a creator of the QA system 405 can select a value of "r" based on intuitions for how redundant the data used in that system is likely to be. In a second example, the seed queries (described above) or actual user queries can be run through the QA system 405 and then an approximate deduplication method can be used to remove duplicates. The QA system 405 then estimates a value of "r" based on a count of how many duplicates were removed. In a third example, the QA system 405 clusters the documents that are used to provide answers and then uses document similarity measures to measure degree of similarity of documents within a cluster. The QA system 405 then estimates a value of "r" based on the measured degree of similarity.

In all techniques described for the multiple answer embodiment, the adjusting the confidence threshold as described herein is performed using only the highest original confidence score of the plural answers. In this manner, the other confidence scores that are not the highest confidence score are used only in determining whether to return a particular answer to the user device.

Figure 6:
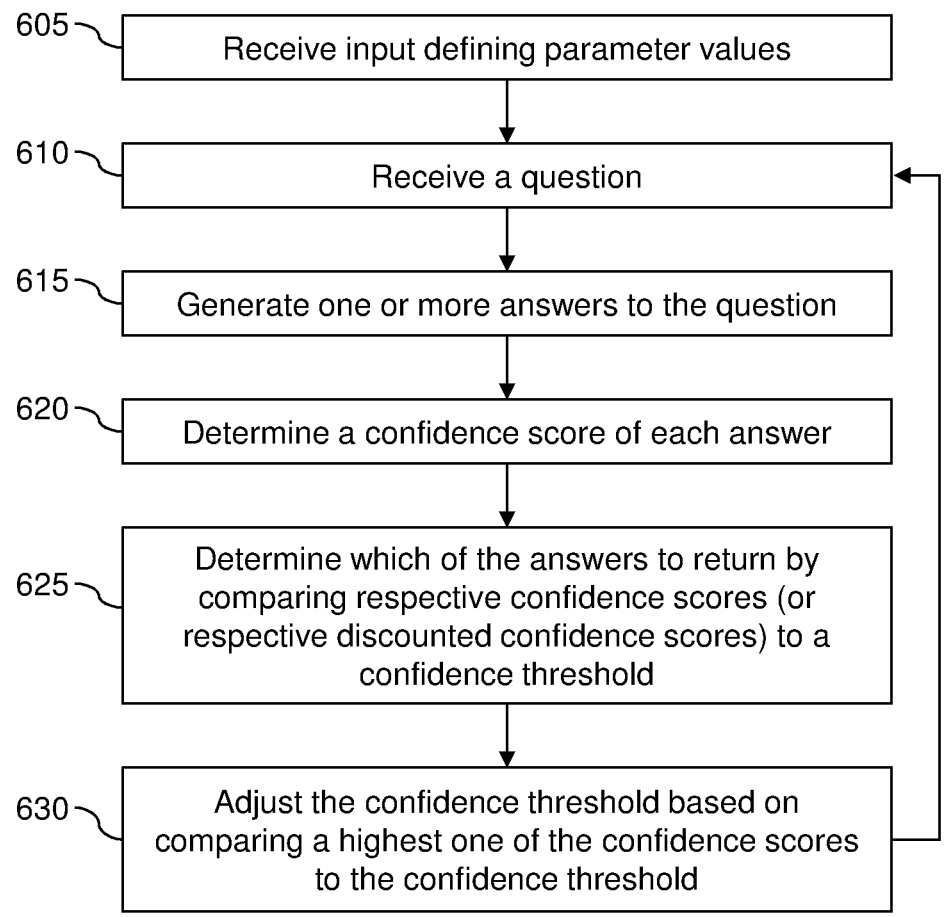
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

At step 605, the system receives input defining parameter values. In embodiments, and as described with respect to FIG. 4, the QA system 405 receives user input defining one or more of: a target answer frequency (f); a learning rate (alpha); an initial value of a confidence threshold (t); and a redundancy discounting factor (r). The user input may be provided via one or more of the user devices 410.

At step 610, the system receives a question. In embodiments, and as described with respect to FIG. 4, the QA system 405 receives a question from a user device 410.

At step 615, the system generates one or more answers to the question from step 610. In embodiments, and as described with respect to FIG. 4, the QA system 405 generates one or more answers to the question using question answering system techniques (e.g., as described in FIGS. 5A and 5B).

At step 620, the system determines a confidence score for each of the one or more answers from step 615. In embodiments, and as described with respect to FIG. 4, the QA system 405 determines the confidence score(s) using question answering system techniques (e.g., as described in FIGS. 5A and 5B). Optionally, step 620 may include the QA system 405 additionally determining a discounted confidence score for each of the answers when plural answers are generated at step 615. For example, the discounted confidence score may be an independence discounted confidence score or a redundancy discounted confidence score, as described herein.

At step 625, the system determines which of the answers (from step 615) to return to the user that asked the question (at step 610) by comparing the respective confidence scores (determined at step 620) to a confidence threshold. In embodiments, and as described herein, the QA system 405 compares the confidence score of each answer to the confidence threshold, returns (to the user device 410) answers whose confidence score is greater than the confidence threshold, and does not return answers whose confidence score is less than the confidence threshold. In embodiments that determine discounted confidence scores for plural answers, step 625 includes the QA system 405 comparing the respective discounted confidence scores to the confidence threshold, returning (to the user device 410) answers whose discounted confidence score is greater than the confidence threshold, and not returning answers whose discounted confidence score is less than the confidence threshold.

At step 630, the system adjusts the confidence threshold based on comparing a highest one of the confidence scores (from step 620) to the confidence threshold. In embodiments, and as described herein, step 630 comprises the QA system 405 either: (i) increasing the confidence threshold for a next question in response to the highest one of the confidence scores being greater than the confidence threshold, or (ii) decreasing the confidence threshold for the next question in response to the highest one of the confidence scores being less than the confidence threshold. In the case when the QA system 405 generates only one answer at step

615, then the confidence score of this one answer is the highest one of the confidence scores used in the comparing at step 630. In embodiments, the adjusting at step 630 is performed in a manner that causes the QA system 405 to approximate the target answering frequency. In a particular exemplary embodiment, the adjusting at step 630 is performed using a first algorithm that incrementally increases the confidence threshold when the highest one of the confidence scores is greater than the confidence threshold so that the system is less likely to answer the next question; and using a second algorithm that incrementally decreases the confidence threshold when the highest one of the confidence scores is less than the confidence threshold so that the system is more likely to answer the next question. The first algorithm may be expression (1) and the second algorithm may be expression (2) as described herein.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a question answering system having a confidence threshold, plural questions from one or more user devices; and
   processing, by the question answering system, each respective one of the plural questions by:
      generating an answer to the respective one of the plural questions;
      determining a confidence score of the answer;
      in response to determining the confidence score is greater than the confidence threshold, increasing the confidence threshold and returning the answer to a respective one of the one or more user devices that generated the respective one of the plural questions; and
      in response to determining the confidence score is less than the confidence threshold, decreasing the confidence threshold and not returning the answer to the respective one of the one or more user devices that generated the respective one of the plural questions,
   wherein the increasing the confidence threshold and the decreasing the confidence threshold are performed such that the question answering system returns answers for the plural questions at a rate that approximates a pre-defined target answering frequency.

2. The method of claim 1, further comprising receiving input defining the target answering frequency.

3. The method of claim 2, wherein the input is received from one of the one or more user devices.

4. The method of claim 2, wherein the increasing the confidence threshold and the decreasing the confidence threshold are performed using at least one algorithm that is a function of the target answering frequency and a learning rate.

5. The method of claim 4, further comprising receiving input defining the learning rate.

6. The method of claim 4, further comprising adjusting the learning rate, during the processing, until the learning rate reaches a predefined minimum value.

7. The method of claim 1, wherein the plural questions comprise:
   a first set of questions comprising seed questions that cause the question answering system to adjust the confidence threshold from an initial value toward a value that approximates the target answering frequency; and
   a second set of questions from users in a target audience.

8. The method of claim 7, wherein the first set of questions are presented to the question answering system prior to the second set of questions being presented to the question answering system.

9. A computer program product comprising one or more computer readable storage media having program instructions collectively stored on the one or more computer readable storage media, the program instructions executable to:
   receive, by a question answering system, a question from a user device;
   generate, by the question answering system, an answer to the question;
   determine, by the question answering system, a confidence score of the answer;
   compare, by the question answering system, the confidence score to a confidence threshold; and
   adjust the confidence threshold, by the question answering system and based on the comparing, by performing one of:
      in response to the confidence score being greater than the confidence threshold, increasing the confidence threshold for a next question; and
      in response to the confidence score being less than the confidence threshold, decreasing the confidence threshold for the next question;
   wherein the increasing the confidence threshold and the decreasing the confidence threshold are performed using at least one algorithm that is a function of a target answering frequency and a learning rate.

10. The computer program product of claim 9, wherein the program instructions are executable to:

return the answer to the user device in response to the confidence score being greater than the confidence threshold; and not return the answer to the user device in response to the confidence score being less than the confidence threshold.

11. The computer program product of claim 9, wherein the program instructions are executable to repeat the receiving, the generating, the determining, the comparing, and the adjusting for plural different questions presented to the question answering system.

12. The computer program product of claim 11, wherein the adjusting the confidence threshold during the repeating causes the question answering system to approximate the target answering frequency for the plural different questions.

13. The computer program product of claim 12, wherein the program instructions are executable to receive user input defining the target answering frequency.

14. The computer program product of claim 11, wherein the program instructions are executable to adjust the learning rate, during the repeating, until the learning rate reaches a predefined minimum value.

15. A question answering system comprising:

a processor, a computer readable memory, one or more computer readable storage media, and program instructions collectively stored on the one or more computer readable storage media, the program instructions executable to:

receive input defining a target answering frequency of the question answering system;

receive a question from a user device;

generate one or more answers to the question;

determine a respective confidence score for each of the one or more answers;

determine which of the one or more answers to return to the user device based on a confidence threshold; and adjust the confidence threshold based on comparing a highest one of the respective confidence scores to the confidence threshold, wherein the adjusting the confidence threshold is performed in a manner that causes the question answering system to approximate the target answering frequency.

16. The question answering system of claim 15, wherein:

the one or more answers comprise plural answers;

the program instructions are executable to determine a respective discounted confidence score for each of the plural answers; and the determining which of the one or more answers to return to the user device comprises comparing the respective discounted confidence scores to the confidence threshold.

17. The question answering system of claim 16, wherein each of the respective discounted confidence scores comprises an independence discounted confidence score.

18. The question answering system of claim 16, wherein each of the respective discounted confidence scores comprises a redundancy discounted confidence score.

19. The question answering system of claim 15, wherein the adjusting the confidence threshold comprises:

in response to the highest one of the respective confidence scores being greater than the confidence threshold, incrementally increasing the confidence threshold using a first algorithm so that the question answering system is less likely to return an answer for a next question; and in response to the highest one of the respective confidence scores being less than the confidence threshold, incrementally decreasing the confidence threshold using a second algorithm so that the question answering system is more likely to return an answer for the next question.

20. The method of claim 1, wherein the plural questions comprise:

a first set of questions comprising seed questions; and a second set of questions from users in a target audience.

* * * * *